US006747372B2

(12) United States Patent
Gilbreth et al.

(10) Patent No.: US 6,747,372 B2
(45) Date of Patent: Jun. 8, 2004

(54) DISTRIBUTED CONTROL METHOD FOR MULTIPLE CONNECTED GENERATORS

(75) Inventors: Mark G. Gilbreth, Simi Valley, CA (US); Brian J. Budzyn, Thousand Oaks, CA (US); Cassie Weissert, Simi Valley, CA (US)

(73) Assignee: Capstone Trubine Corporation, Chatsworth, CA (US)

( * ) Notice: Subject to any disclaimer, the term of this patent is extended or adjusted under 35 U.S.C. 154(b) by 317 days.

(21) Appl. No.: 10/007,219

(22) Filed: Nov. 2, 2001

(65) Prior Publication Data

US 2002/0089234 A1 Jul. 11, 2002

Related U.S. Application Data

(60) Provisional application No. 60/245,699, filed on Nov. 2, 2000.

(51) Int. Cl.[7] .................................................. H02J 1/00
(52) U.S. Cl. ......................... 307/85; 307/52; 307/59; 307/64; 307/65; 307/68; 307/80; 307/84; 307/87
(58) Field of Search ............................ 307/64, 65, 68, 307/80, 84, 85, 87, 52, 59

(56) References Cited

U.S. PATENT DOCUMENTS 5,794,212 A    8/1998   Mistr, Jr.

FOREIGN PATENT DOCUMENTS

| EP | 0 286 377 A2 | 10/1988 |
|---|---|---|
| EP | 0 660 568 A1 | 6/1995 |
| GB | 2 316 269 A | 2/1998 |
| WO | WO 99/62161 | 12/1999 |
| WO | WO 00/13287 | 3/2000 |
| WO | WO 02/37638 A2 | 5/2002 |

OTHER PUBLICATIONS

U.S. patent application Ser. No. 10/002,327, Edelman et al., filed Nov. 1, 2006.
Copy of International Search Report from PCT Appl. No. PCT/US01/46354, completed Jul. 2, 2002, 6 pages.
Copy of International Search Report from PCT Appl. No. PCT/US01/46266, completed Jul. 2, 2002, 6 pages.
Patent Abstracts of Japan, Publication No. 10–136466, Japanese Patent Office, 2 pages (May 22, 1998).
Patent Abstracts of Japan, Publication No. 2000–134994, Japanese Patent Office, 2 pages (Dec. 5, 2000).
Flür, M. and Tendyck, H., "Mit Lon Works: Daten auf der Netzleitung—Kommunikation von Steckdose zu Steckdose," *Elektronik* 43(4):102–105, Franzis Verlag GmbH (Feb. 22, 1994).
Anonymous, "Remote Access to Front Panel Controls and Indicators," *Research Disclosure* 42380:982–984, International Business Machines Corporation (Jul. 1999).

*Primary Examiner*—Robert L DeBeradinis
(74) *Attorney, Agent, or Firm*—Sterne, Kessler, Goldstein & Fox P.L.L.C.

(57) ABSTRACT

An energy generation network according to the present disclosure includes energy generating elements organized in a tree structure of superior and inferior system levels, with control systems and a communication network. In a currently preferred embodiment, energy generating elements are turbogenerators as described above. Communications and processing are distributed throughout the systems and sub-systems of energy generating elements. Inferior sub-systems and systems of sub-systems appears as a single unit to the superior system or sub-system level. Thus, the energy generating elements appears as a seamless single energy generating unit. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

31 Claims, 9 Drawing Sheets

N-NODE TREE OF MICRO TURBINE GENERATORS

SIMPLE N-NODE TREE OF MICRO TURBINE GENERATORS

DISTRIBUTED CONTROL METHOD FOR MULTIPLE CONNECTED GENERATORS

RELATED APPLICATIONS

This application claims the priority of U.S. provisional patent application Serial No. 60/245,699 filed Nov. 2, 2000.

BACKGROUND OF THE INVENTION

1. Field of the Invention

This invention relates to the general field of energy generation systems, and more particularly to control methods for distributed systems of turbogenerators.

2. Description of the Prior Art

While a 30 kW generator may be more than enough power for a typical home, larger facilities will need some method of connecting multiple systems together to form a single, larger generator. A typical home consumes somewhere in the range of 4 kW to 6 kW of peak power. In this instance, a single 30 kW turbogenerator or other power generator could support the power requirements of multiple homes. Businesses, such as a convenience store, requiring 60 kW, 100 kW or more, may require multiple 30 kW generators to provide the required power.

It is more desirable to interface with one generator rather than sequencing several smaller generator sets to provide the required power. A large motor load of 60 kW would require at least two 30 kW generator sets in order to provide the necessary power. These units would manually have to be sequenced and have their output contactors closed simultaneously through user command to commence power output. To integrate power generation into a larger control system, communications would have to be established from the main control computer to each individual generator. Operation is made simpler by combining multiple single generators into a single large generator system.

Connecting multiple systems requires communications in order to synchronize both operation and power generation. In order to connect multiple generator-systems together, issues must be addressed such as starting, output contact closure, and power produced by each generator system. These issues require some form of communication between the individual units in the pack. In the past, this has been accomplished through the use of analog wires. The system discussed herein accomplishes this through digital communications including a 10Base-2 bus for control and sequence and an RS-485 bus for synchronization of the power output.

Communications used to gang a multi-generator system together often have length limitations that must be overcome by repeaters or routers. While 10base-2 and RS-485 communications provide the benefits of isolation in a power generation system, both have maximum length requirements. These maximum communication length requirements will in turn limit the number of systems that can be ganged together in multiple system configurations. Line lengths can span 15 to 20 ft or more between systems, eating up these maximum length requirements very quickly.

Control algorithms and communications will create processing bandwidth limitations. Often micro-controllers that are designed to perform control system functions may not have intensive communications capabilities such as Dynamic Memory Access (DMA). Most processing time will be utilized to execute the controls of the primary system (i.e. MicroTurbine functions, including power and fuel control). Processing throughput or managing and communicating with sub-systems then becomes limited. A single system will only have enough processing power to make decisions, communicate, and verify the response for a limited number of systems. While the communications media might contain enough bandwidth, the processing will be limited.

Therefore, what is needed is a method of distributing the communications and processing in order to provide control above some number of units. Because there will be processing and communication distance limitations, at some point a system should act as a router. It will be responsible for receiving commands and then distributing the commands to some number of sub-systems. Those systems may pass commands on in turn.

SUMMARY OF THE INVENTION

In a first aspect, the present disclosure provides an energy generation network including a plurality of energy generating elements capable of receiving system commands, generating system commands, and distributing system commands; and a plurality of systems and subsystems of energy generating elements, organized using subsets of the plurality of energy generating elements; and a plurality of control systems for controlling the plurality of systems and subsystems of energy generating elements; and a communication network interconnecting the plurality of control systems and the plurality of systems and subsystems of energy generating elements.

In another aspect, the present disclosure provides a method of distributing communications and processing in an energy generation network including the steps of providing a plurality of energy generating elements capable of receiving system commands, generating system commands, and distributing system commands; and providing a plurality of systems and subsystems of energy generating elements, organized using subsets of the plurality of energy generating elements; and monitoring one or more operating parameters for one or more of a plurality of systems and subsystems of energy generating elements; and determining energy demands; and generating system commands; and transmitting system commands from a superior energy generating element in a system or subsystem of energy generating elements to each inferior energy generating element in the system or subsystem of energy generating elements.

In yet another aspect, the present disclosure provides for an energy generation network including a plurality of energy generating elements capable of receiving system commands, generating system commands, and distributing system commands; and a plurality of systems and subsystems of energy generating elements, organized using subsets of the plurality of energy generating elements, such that an energy generating element is connected only to one superior energy generating element and may be connected to one or more inferior energy generating elements; and a plurality of control systems for controlling the plurality of systems and subsystems of energy generating elements wherein the control system for an energy generating element monitors only itself and any inferior energy generating elements; and a communication network interconnecting the plurality of control systems and the plurality of systems and subsystems of energy generating elements.

In yet another aspect, the present disclosure provides a method of distributing communications and processing in an energy generation network including the steps of providing a plurality of energy generating elements capable of receiving system commands, generating system commands, and distributing system commands; and providing a plurality of systems and subsystems of energy generating elements, organized using subsets of the plurality of energy generating elements, such that an energy generating element is connected only to one superior energy generating element and may be connected to one or more inferior energy generating elements; and determining energy demands; and monitoring operating parameters for the energy generating elements of a subsystem of energy generating elements; and generating total operating parameter information for the subsystem of energy generating elements; and generating system commands for the subsystem of energy generating elements based on the total operating parameter information for the subsystem of energy generating elements and energy demand; and monitoring the total operating parameter information for the subsystems of energy generating elements in a system of subsystems of energy generating elements; and generating total operating parameter information for the system of subsystems of energy generating elements; and generating system commands for the system of subsystems of energy generating elements based on the total operating parameter information for the system of subsystems of energy generating elements and energy demand; and transmitting system commands from a superior energy generating element in a system or subsystem of energy generating elements to each inferior energy generating element in the system or subsystem of energy generating elements.

In yet another aspect, the present disclosure provides an energy generation network including a plurality of energy generating elements capable of receiving system commands, generating system commands, and distributing system commands; and a plurality of systems and subsystems of energy generating elements, organized using subsets of the plurality of energy generating elements; and means for monitoring one or more operating parameters for one or more of a plurality of systems and subsystems of energy generating elements; and means for determining energy demands; and means for generating system commands; and means for transmitting system commands from a superior energy generating element in a system or subsystem of energy generating elements to each inferior energy generating element in the system or subsystem of energy generating elements.

In yet another aspect, the present disclosure provides an energy generation network including a plurality of energy generating elements capable of receiving system commands, generating system commands, and distributing system commands; and a plurality of systems and subsystems of energy generating elements, organized using subsets of the plurality of energy generating elements, such that an energy generating element is connected only to one superior energy generating element and may be connected to one or more inferior energy generating elements; and means for determining energy demands; and means for monitoring operating parameters for the energy generating elements of a subsystem of energy generating elements; and means for generating total operating parameter information for the subsystem of energy generating elements; and means for generating system commands for the subsystem of energy generating elements based on the total operating parameter information for the subsystem of energy generating elements and energy demand; and means for monitoring the total operating parameter information for the subsystems of energy generating elements in a system of subsystems of energy generating elements; and means for generating total operating parameter information for the system of subsystems of energy generating elements; and means for generating system commands for the system of subsystems of energy generating elements based on the total operating parameter information for the system of subsystems of energy generating elements and energy demand; and means for transmitting system commands from a superior energy generating element in a system or subsystem of energy generating elements to each inferior energy generating element in the system or subsystem of energy generating elements.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE PREFERRED EMBODIMENT(S)

30 kW turbogenerator systems are available for deployment in stationary and vehicular applications. Stationary applications are defined as installations where the generator either provides power in parallel with the utility or primary power. When providing power in parallel with the utility (or some other generator) a turbogenerator may use the voltage waveform provided by the existing generation and variable current to produce the user demanded power. These applications are most often peak shaving, load following, or combined heat and power (CHP) applications. As a primary power source, a turbogenerator system controls a stable voltage reference and delivers variable current to provide load power required. Typically these applications are remote sites where a utility does not exist or where economics make more sense to produce power independent of the utility.

Figure 1A:
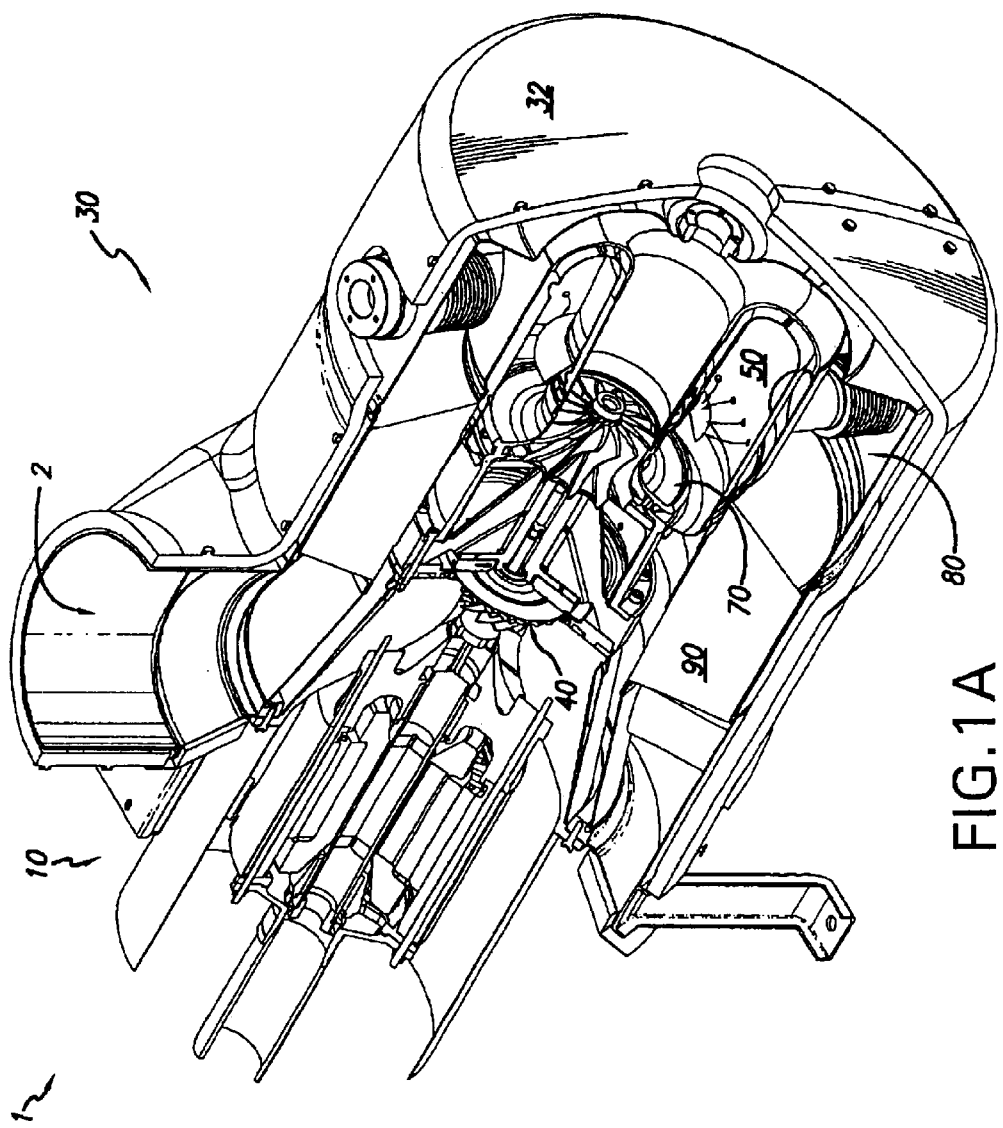
FIG. 1A is perspective view, partially in section, of an integrated turbogenerator system.

With reference to FIG. 1A, an integrated turbogenerator 1 according to the present invention generally includes motor/generator section 10 and compressor-combustor section 30. Compressor-combustor section 30 includes exterior can 32, compressor 40, combustor 50 and turbine 70. A recuperator 90 may be optionally included.

Figure 1B:
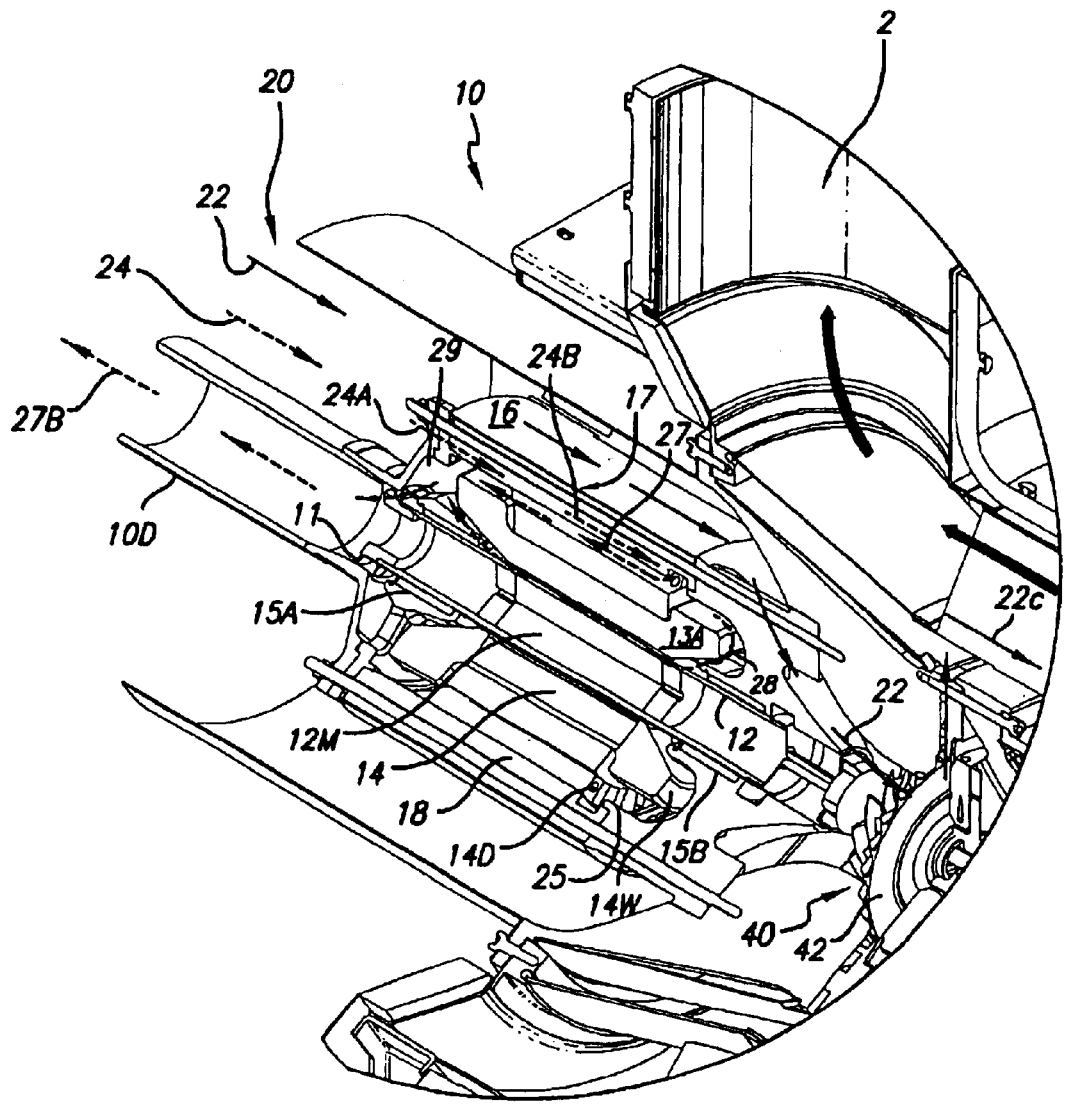
FIG. 1B is a magnified perspective view, partially in section, of the motor/generator portion of the integrated turbogenerator of FIG. 1A.
Figure 1C:
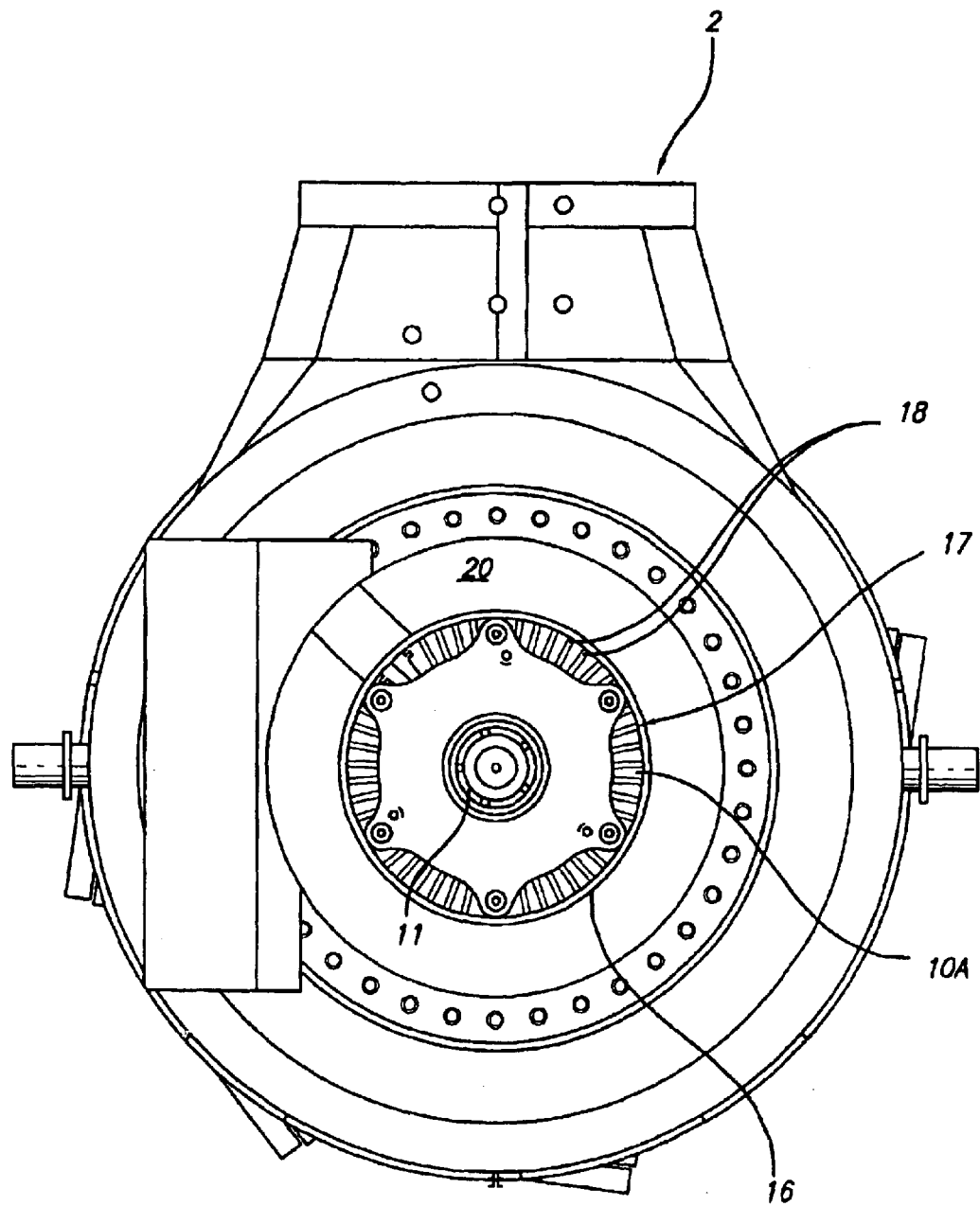
FIG. 1C is an end view, from the motor/generator end, of the integrated turbogenerator of FIG. 1A.

Referring now to FIG. 1B and FIG. 1C, in a currently preferred embodiment of the present invention, motor/generator section 10 may be a permanent magnet motor generator having a permanent magnet rotor or sleeve 12.

Any other suitable type of motor generator may also be used. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Figure 1D:
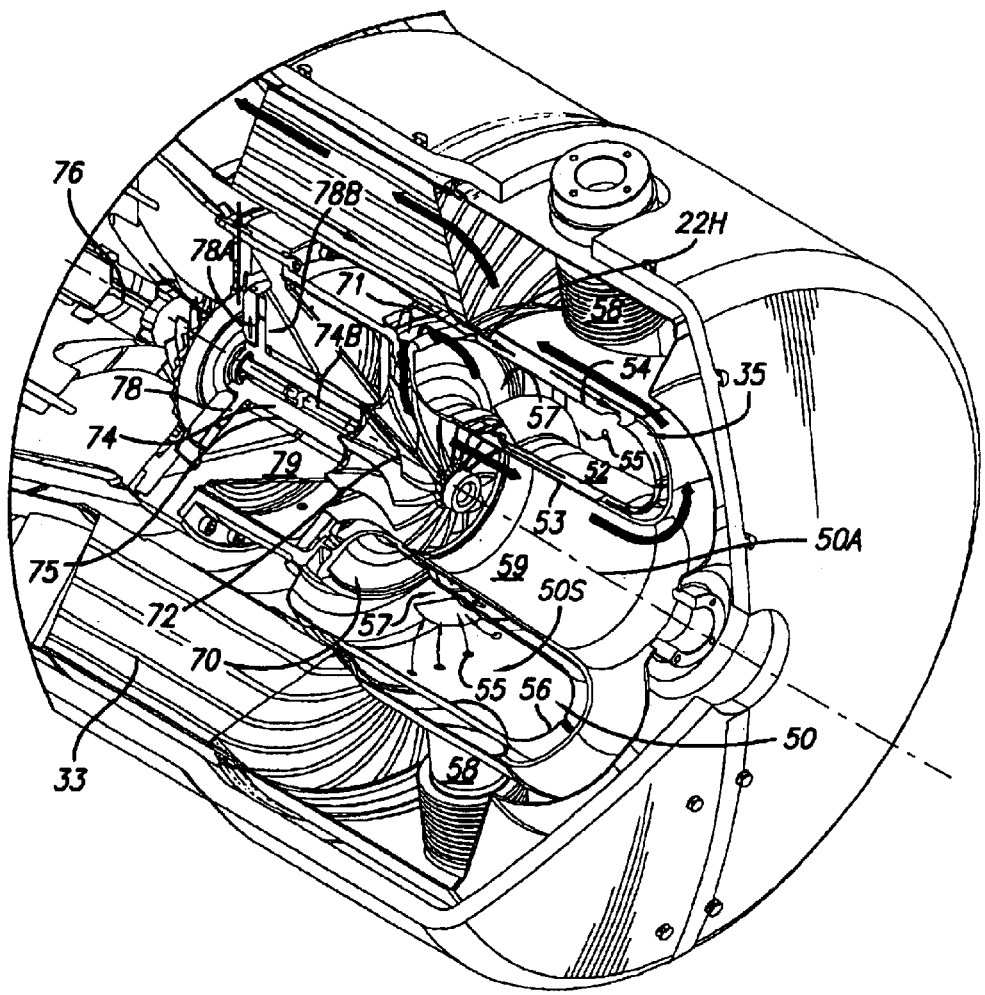
FIG. 1D is a magnified perspective view, partially in section, of the combustor-turbine exhaust portion of the integrated turbogenerator of FIG. 1A.
Figure 2:
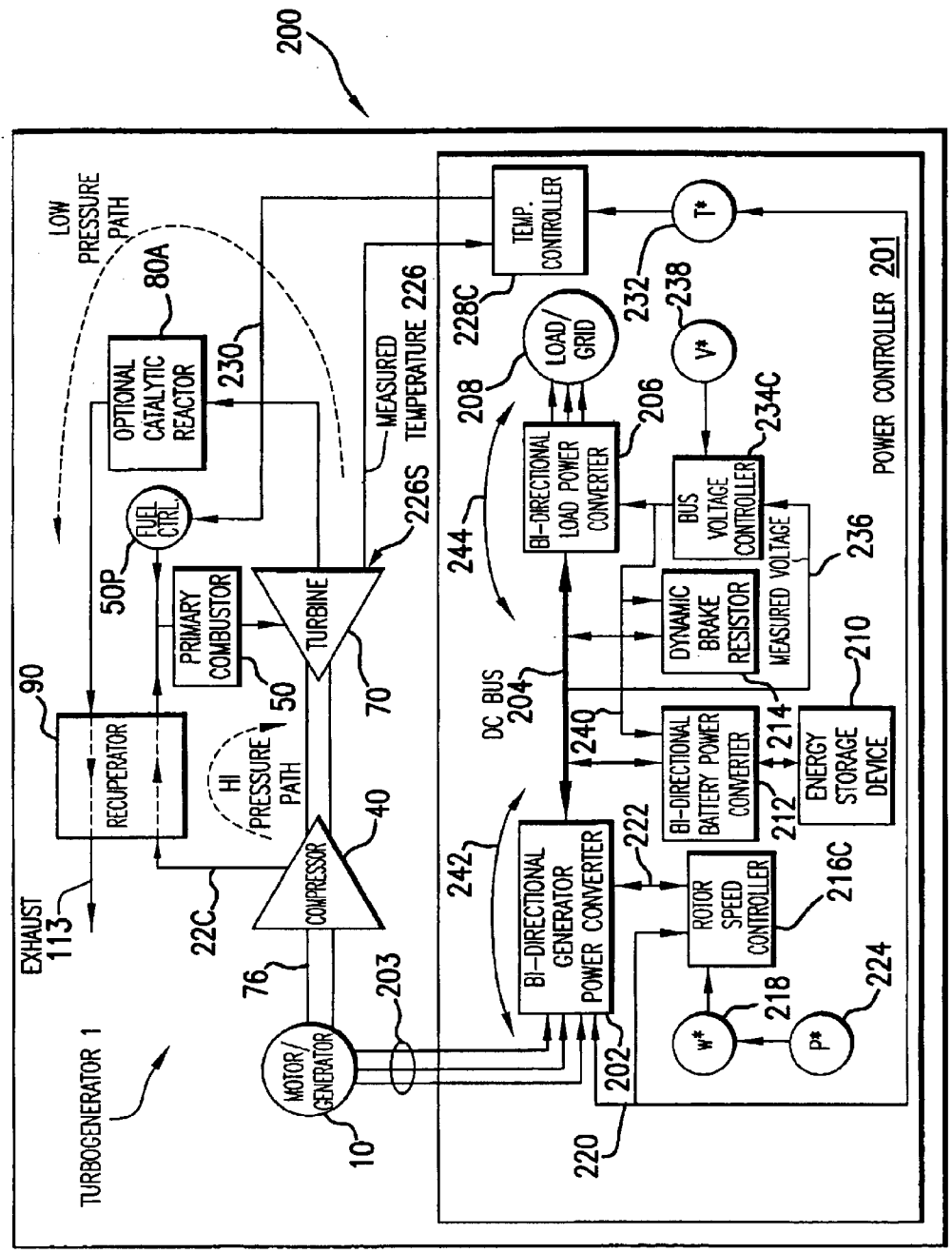
FIG. 2 is a block diagram schematic of a turbogenerator system including a power controller having decoupled rotor speed, operating temperature, and DC bus voltage control loops.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 51. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 76 is rotatably supported preferably by a bilateral thrust bearing 78A and 78B. Journal or radial bearing 75 and thrust bearings 78A and 78B may be fluid film or foil bearings.

Turbine wheel 72, Bearing rotor 74 and Compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Figure 1E:
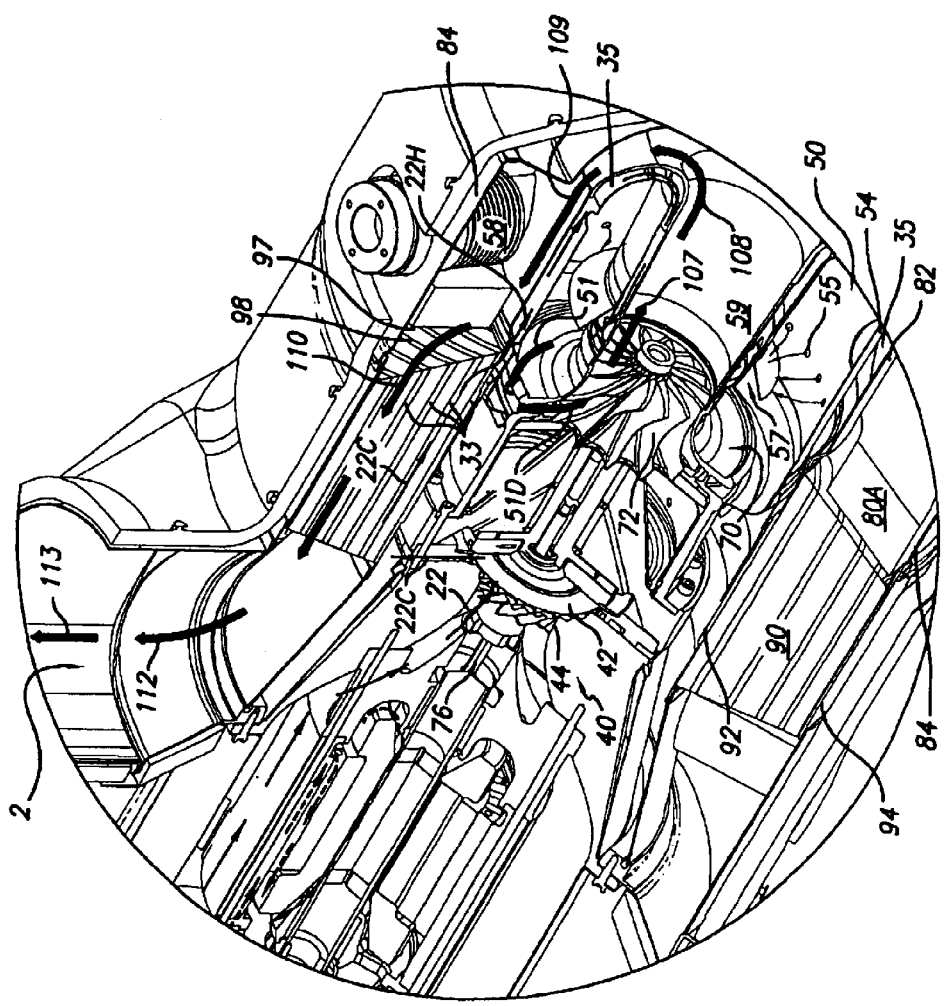
FIG. 1E is a magnified perspective view, partially in section, of the compressor-turbine portion of the integrated turbogenerator of FIG. 1A.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 98 of recuperator 90, as indicated by gas flow arrows 108 and 109 respectively.

In an alternate embodiment of the present invention, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Mechanical Structural Embodiments of the Integrated Turbogenerator The integrated turbogenerator disclosed above is exemplary. Several alternative structural embodiments are known.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

Alternative Use of the Invention Other than in Integrated Turbogenerators

An integrated turbogenerator is a turbogenerator in which the turbine, compressor, and generator are all constrained to rotate based upon rotation of the shaft to which the turbine is connected. The invention disclosed herein is preferably but not necessarily used in connection with a turbogenerator, and preferably but not necessarily used in connection with an integrated turbogenerator.

Turbogenerator System Including Controls

Referring now to FIG. 2, a preferred embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998 in the names of Gilbreth, Wacknov and Wall, and assigned to the assignee of the present application which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bi-directional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bi-directional load power converter 206 and bi-directional battery power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

Distributed Control Method for Multiple Connected Generators

The concept described in this invention applies an N-node tree organization structure described in FIG. 1 to the power generation field to solve the previously described processing and communications issues. Generator units 300, 302, 304 will have a slave in and master out Inter-Communication port 306 (10Base-2 for this implementation) to implement this structure. Each generator unit 300, 302, 304 connected to the tree represents a node. Each node is then assigned to be a system master 300, sub-system master 302, or sub-system slave 304 to designate the pathway of communications.

The relationship of the system levels of the tree organization structure may be characterized in terms of superior or inferior connections: system masters 300 have no superior connections; slaves 304 have no inferior connections; and sub-system masters 302 have both superior and inferior connections. For example, in FIG. 1, system master 300 is superior to any sub-system masters 302 and slaves 304, which are directly connected to system master 300. These sub-system masters 302 and slaves 304, which are directly connected to system master 300, are inferior to system master 300. Each of sub-system masters 302 is superior to any other sub-system masters 302 and slaves 304, which are directly connected to sub-system masters 302. Conversely, these sub-system masters 302 and slaves 304, which are directly connected to sub-system masters 302, are inferior to sub-system master 302. The total number of levels and inferior connections in a system or subsystem may vary.

This N-node tree architecture is first solved in its simplest form in FIG. 2 with single master 300 and slaves 304 for all sub-systems. This would only require single Inter-Communication port 306 on each system to transmit data from master 300 to slaves 304.

Node assignments could be automatically detected by determining what inter-communication connections are made. Master system 300 would have only a master out connection made. Sub-system master 302 would have connections made to both slave in and master out ports. Slave system 304 will have a connection made only to the slave in port. A single unit (not shown) has no connections made. For this particular application, we have chosen to implement a scheme where system node assignments are made through user input 310 selection.

In the implementation described, each system functions as slave 304. As slave 304, the system is capable of receiving commands from some other system (or user input) to signal start/stop, mode, and power demand functions. Processing of these commands is performed on itself to sequence turbine and power electronics functions accordingly. This incorporates all of the standard functionality of a single microturbine system including grid-connect, stand-alone, engine controls, fuel controls, display functions, etc.

Each system can also be master 300 of multiple of units. All systems contain the software required to function as master system 300. When appointed as master system 300, commands are received and further processed to sub-systems. Master system 300 will receive user input 310 from the display or through some external control system connected to user communications (RS232 for this implementation). Sub-master 302 will perform all the sub-system control functions of master 300, but will receive its input from the Inter-Communications bus 308 (10Base-2 for this implementation).

Figure 3:
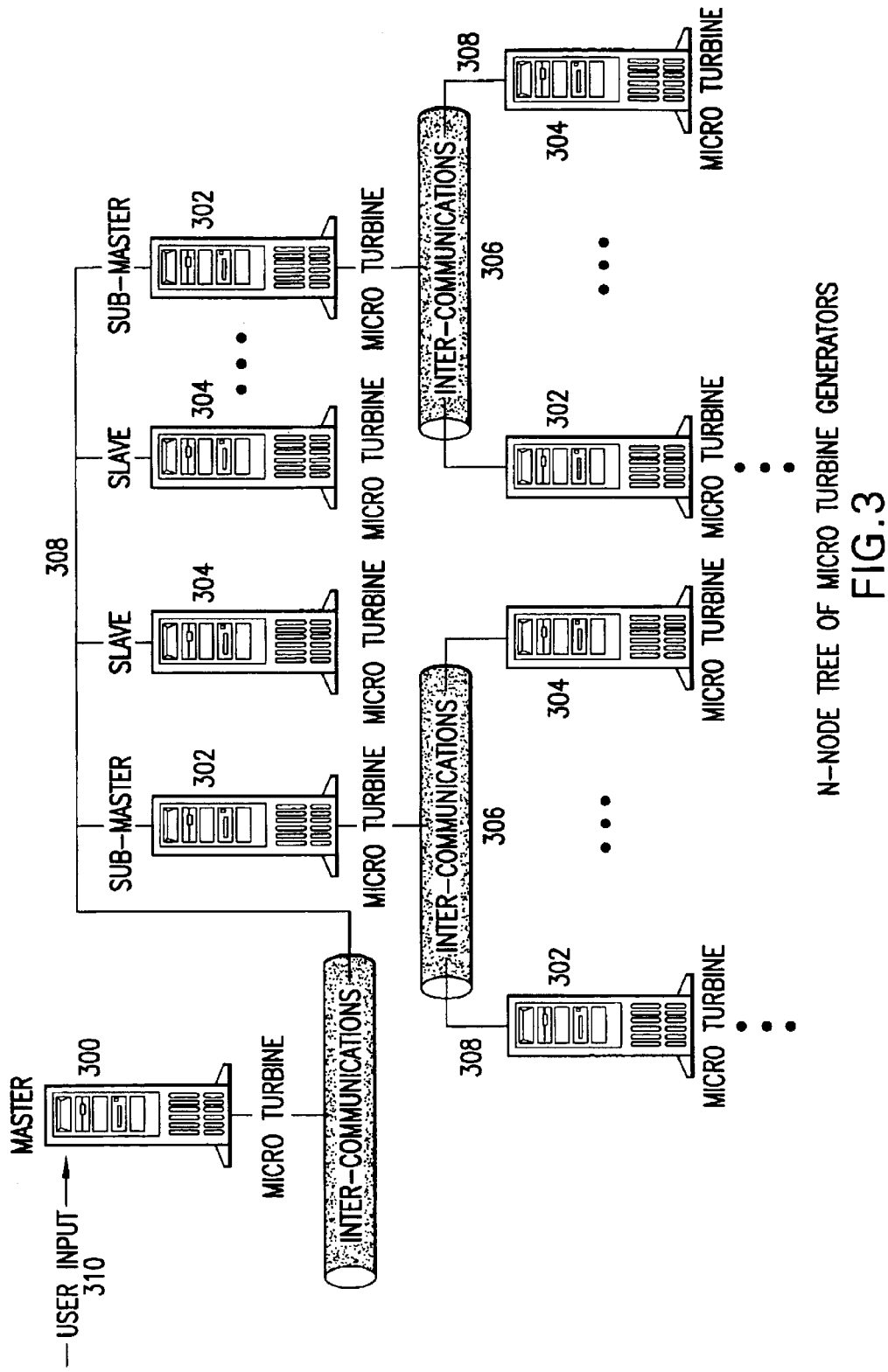
FIG. 3 is a diagram of an n-node tree of generator units.
Figure 4:
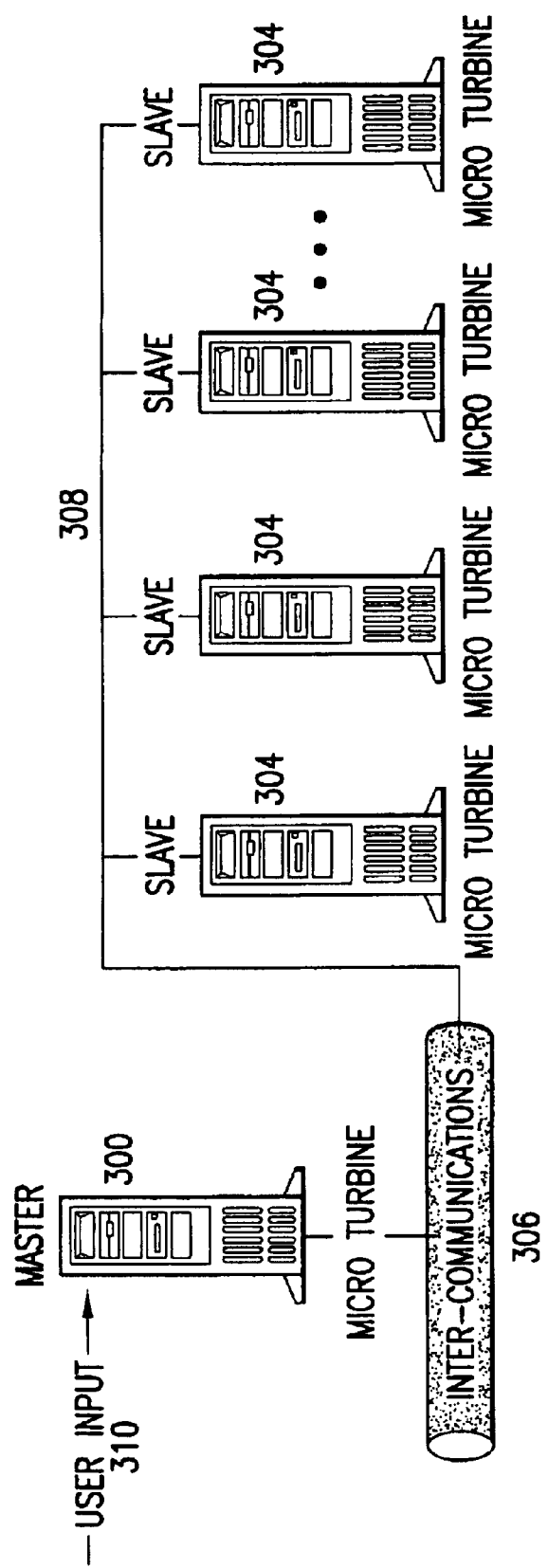
FIG. 4 is a diagram of a simple n-node tree of generator units.
Figure 5:
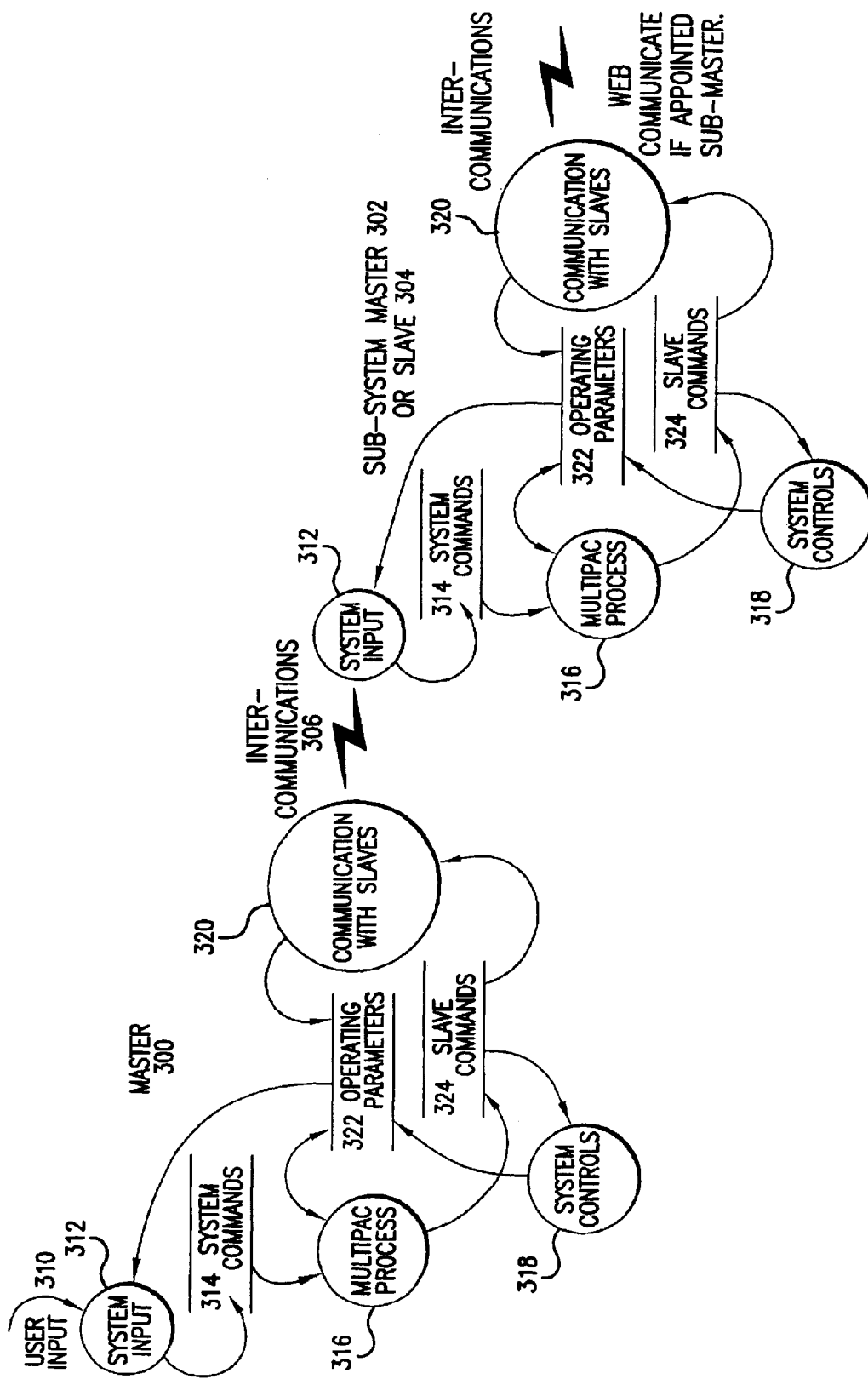
FIG. 5 is a diagram of the software data structure/process.

This n-node architecture is accomplished, in FIG. 3, through a software data structure for System Commands 314 received by master system 300 or user input 310. A selector (master, sub-master, slave) is created in the software to determine whether System Input 312 is processed from user input 310 or intercommunications 306. If the system is assigned as master 300, commands come from user input 310 sources (display and RS232 for this implementation). If a system is assigned as sub-master 302 or slave 304, input comes from the inter-communications bus 308. Nonetheless the data enters the same System Commands 314 data structure so remaining processes in a system can operate independent of the command-input source.

This n-node architecture is accomplished through a software data structure for Slave Commands 324 that are transmitted to the slave 304 sub-systems. On each system, MultiPac Process 316 software exists to transform System Commands 314 data into Slave Commands 324. This process always executes regardless of the node assignment to determine at least Slave Commands 324 for the present generating unit.

This n-node architecture is accomplished through Operating Parameters 322 software data structure that provides feedback about a sub-system. When Slave Commands 324 are transmitted with processed by Communicate with Slaves 324, data is returned about that systems operation. This data is stored in Operating Parameters 322 data structure. Master 300 or sub-system master 302 then processes all of the sub-system data with MultiPac Process 316 and stores the sum of the information back in the Operating Parameters 322. A subsystem master 302 reports total operating parameter information for itself and connected sub-systems. This makes it look like a seamlessly large power unit. The trivial case is when the sub-system is a slave, the sum of its sub-system operating parameters will represent only itself.

The n-node architecture is accomplished by using System Controls 318 process, to control sequencing and power generation on the unit. A generating unit processes its own Slave Commands 324 using the System Controls 318 process. The System Controls 318 process performs functions such as motor starting, fuel delivery, and power generation. Results of this process and data acquisition are compiled and stored in the Operating Parameters 322 data structure.

This invention covers a combination of the hardware and software design. The hardware configuration performs the function of a router without requiring additional equipment. Software design is included for its ability to distribute processing to perform MultiPac functionality and standard single-unit System Controls 318 with a single microprocessor. Each generator node is able to handle processing for a number of sub-systems to accomplish this distributed processing.

An advantage of this architecture is that if one point on the communication link is severed, units in the sub-branches will be able to continue operating. If communications were interrupted on a single multi-drop communications bus supplying an entire system, then the entire system would shutdown. In this case, several multi-drop buses are established in each bus network. Higher reliability is achieved with multiple multi-drop communication buses. Should one fail the remaining branches can continue to operate independently.

Another advantage to this architecture is that the same software design structure operates master 300, sub-system master 302, slave 304 and single units.

A reliability advantage to MultiPac Process 316 design is the ability for slave 304 to be disabled and removed from the pack for service, while the pack continues to operate.

Another reliability advantage is that the master function is redundant amongst systems. Should the turbine or power electronics fail in master system 300, it will be capable of controlling slaves 304 as long as its microelectronics can function. Should master 300 become totally inoperable, slave 304 device will have been appointed as sub-master 302 to take over. Sub-master 302 will promote itself to master 300 if it does not receive communication from its master system within some reasonable time period (i.e. 5 seconds).

This control architecture is not limited to MicroTurbine™ generator can be applied to other power generation systems.

This control architecture supports the integration of various generator systems (including reciprocating engines, fuel cells, MicroTurbines, windmills, solar power, etc.) as a seamlessly larger generator.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. An energy generation network comprising:
   a plurality of energy generating elements capable of receiving system commands, generating system commands, and distributing system commands;
   a plurality of systems and subsystems of energy generating elements, organized using subsets of the plurality of energy generating elements;
   a plurality of control systems for controlling the plurality of systems and subsystems of energy generating elements; and
   a communication network interconnecting the plurality of control systems and the plurality of systems and subsystems of energy generating elements.

2. The energy generation network of claim 1 wherein the plurality of energy generating elements further comprises:
   a plurality of turbogenerators, each turbogenerator producing electricity and having a plurality of operating parameters.

3. The energy generation network of claim 2 wherein the plurality of turbogenerators further comprises:
   a plurality of permanent magnet turbogenerators, each turbogenerator producing electricity and having a plurality of operating parameters.

4. The energy generation network of claim 1 wherein:
   any one or more of the plurality of energy generating elements may be removed from any one or more of the systems or subsystems of energy generating elements without disrupting operation of the remaining energy generating elements.

5. The energy generation network of claim 1 wherein the plurality of control systems further comprises:
   one or more input sources.

6. The energy generation network of claim 5 wherein the one or more input sources further comprises:
   a user input.

7. The energy generation network of claim 1 wherein the communication network further comprises:
   a digital communications bus.

8. The energy generation network of claim 7 wherein the digital communications bus further comprises:
   a plurality of multi-drop communication buses, each communication bus capable of independent operation.

9. The energy generation network of claim 1 wherein each of the plurality of systems and subsystems of energy generating elements further comprises:
   a plurality of energy generating elements connected in a tree structure, such that an energy generating element is connected only to one superior energy generating element and may be connected to one or more inferior energy generating elements.

10. The energy generation network of claim 9 wherein:
    the control system for an energy generating element monitors only itself and any inferior energy generating elements.

11. A method of distributing communications and processing in an energy generation network comprising the steps of:
    providing a plurality of energy generating elements capable of receiving system commands, generating system commands, and distributing system commands;
    providing a plurality of systems and subsystems of energy generating elements, organized using subsets of the plurality of energy generating elements;
    monitoring one or more operating parameters for one or more of a plurality of systems and subsystems of energy generating elements;
    determining energy demands;
    generating system commands; and
    transmitting system commands from a superior energy generating element in a system or subsystem of energy generating elements to each inferior energy generating element in the system or subsystem of energy generating elements.

12. The method of claim 11 wherein the plurality of energy generating elements further comprises:
    a plurality of turbogenerators, each turbogenerator producing electricity and having a plurality of operating parameters.

13. The method of claim 12 wherein the plurality of turbogenerators further comprises:
    a plurality of permanent magnet turbogenerators, each turbogenerator producing electricity and having a plurality of operating parameters.

14. The method of claim 11 further comprising the steps of:
    monitoring operating parameters for the energy generating elements of a subsystem of energy generating elements; and
    generating total operating parameter information for the subsystem of energy generating elements.

15. The method of claim 14 further comprising the steps of:
    generating system commands for the subsystem of energy generating elements based on the total operating parameter information for the subsystem of energy generating elements and energy demand.

16. The method of claim 15 further comprising the steps of:
    monitoring the total operating parameter information for the subsystems of energy generating elements in a system of subsystems of energy generating elements; and
    generating total operating parameter information for the system of subsystems of energy generating elements.

17. The method of claim 16 further comprising the steps of:
    generating system commands for the system or subsystems of energy generating elements based on the total operating parameter information for the system of subsystems of energy generating elements and energy demand.

18. The method of claim 17 wherein each of the plurality of systems and subsystems of energy generating elements further comprises:

a plurality of energy generating elements connected in a tree structure, such that an energy generating element is connected only to one superior energy generating element and may be connected to one or more inferior energy generating elements.

19. An energy generation network comprising:

a plurality of energy generating elements capable of receiving system commands, generating system commands, and distributing system commands;

a plurality of systems and subsystems of energy generating elements, organized using subsets of the plurality of energy generating elements, such that an energy generating element is connected only to one superior energy generating element and may be connected to one or more inferior energy generating elements;

a plurality of control systems for controlling the plurality of systems and subsystems of energy generating elements wherein the control system for an energy generating element monitors only itself and any inferior energy generating elements; and a communication network interconnecting the plurality of control systems and the plurality of systems and subsystems of energy generating elements.

20. The energy generation network of claim 19 wherein the plurality of energy generating elements further comprises:

a plurality of turbogenerators, each turbogenerator producing electricity and having a plurality of operating parameters.

21. The energy generation network of claim 20 wherein the plurality of turbogenerators further comprises:

a plurality of permanent magnet turbogenerators, each turbogenerator producing electricity and having a plurality of operating parameters.

22. The energy generation network of claim 19 wherein:

any one or more of the energy generating elements may be removed from any one or more of the systems or subsystems of energy generating elements without disrupting operation of the remaining energy generating elements.

23. The energy generation network of claim 19 wherein the plurality of control systems further comprises:

one or more input sources.

24. The energy generation network of claim 23 wherein the one or more input sources further comprises:

a user input.

25. The energy generation network of claim 19 wherein the communication network further comprises:

a digital communications bus.

26. The energy generation network of claim 25 wherein the digital communications bus further comprises:

a plurality of multi-drop communication buses, each communication bus capable of independent operation.

27. A method of distributing communications and processing in an energy generation network comprising the steps of:

providing a plurality of energy generating elements capable of receiving system commands, generating system commands, and distributing system commands;

providing a plurality of systems and subsystems of energy generating elements, organized using subsets of the plurality of energy generating elements, such that an energy generating element is connected only to one superior energy generating element and may be connected to one or more inferior energy generating elements;

determining energy demands;

monitoring operating parameters for the energy generating elements of a subsystem of energy generating elements;

generating total operating parameter information for the subsystem of energy generating elements;

generating system commands for the subsystem of energy generating elements based on the total operating parameter information for the subsystem of energy generating elements and energy demand;

monitoring the total operating parameter information for the subsystems of energy generating elements in a system of subsystems of energy generating elements;

generating total operating parameter information for the system of subsystems of energy generating elements;

generating system commands for the system of subsystems of energy generating elements based on the total operating parameter information for the system of subsystems of energy generating elements and energy demand; and transmitting system commands from a superior energy generating element in a system or subsystem of energy generating elements to each inferior energy generating element in the system or subsystem of energy generating elements.

28. The method of claim 27 wherein the plurality of energy generating elements further comprises:

a plurality of turbogenerators, each turbogenerator producing electricity and having a plurality of operating parameters.

29. The method of claim 28 wherein the plurality of turbogenerators further comprises:

a plurality of permanent magnet turbogenerators, each turbogenerator producing electricity and having a plurality of operating parameters.

30. An energy generation network comprised of:

a plurality of energy generating elements capable of receiving system commands, generating system commands, and distributing system commands;

a plurality of systems and subsystems of energy generating elements, organized using subsets of the plurality of energy generating elements;

means for monitoring one or more operating parameters for one or more of a plurality of systems and subsystems of energy generating elements;

means for determining energy demands;

means for generating system commands; and means for transmitting system commands from a superior energy generating element in a system or subsystem of energy generating elements to each inferior energy generating element in the system or subsystem of energy generating elements.

31. An energy generation network comprised of:

a plurality of energy generating elements capable of receiving system commands, generating system commands, and distributing system commands;

a plurality of systems and subsystems of energy generating elements, organized using subsets of the plurality of energy generating elements, such that an energy generating element is connected only to one superior energy generating element and may be connected to one or more inferior energy generating elements;

means for determining energy demands;

means for monitoring operating parameters for the energy generating elements of a subsystem of energy generating elements;

means for generating total operating parameter information for the subsystem of energy generating elements;

means for generating system commands for the subsystem of energy generating elements based on the total operating parameter information for the subsystem of energy generating elements and energy demand;

means for monitoring the total operating parameter information for the subsystems of energy generating elements in a system of subsystems of energy generating elements;

means for generating total operating parameter information for the system of subsystems of energy generating elements;

means for generating system commands for the system of subsystems of energy generating elements based on the total operating parameter information for the system of subsystems of energy generating elements and energy demand; and means for transmitting system commands from a superior energy generating element in a system or subsystem of energy generating elements to each inferior energy generating element in the system or subsystem of energy generating elements.

* * * * *